Patented May 18, 1937

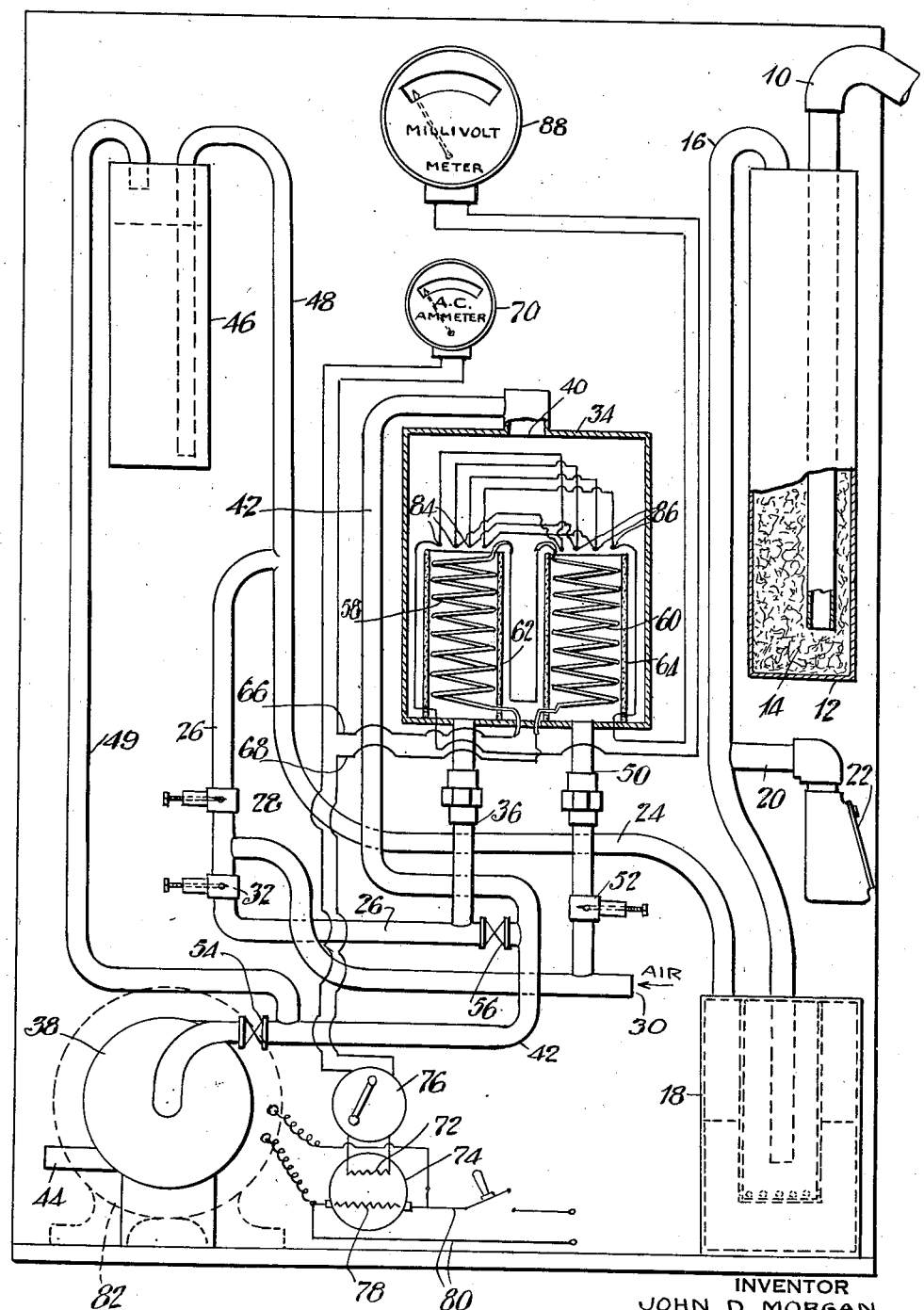

2,081,094

UNITED STATES PATENT OFFICE 2,081,094

GAS ANALYSIS METHOD AND APPARATUS

John D. Morgan, South Orange, N. J., assignor to Power Patents Company, Jersey City, N. J., a corporation of Maine.

Application August 12, 1931, Serial No. 556,556

5 Claims. (Cl. 23—232)

This invention relates to apparatus for measuring quantitatively the amount of combustible components in a gaseous mixture, and particularly to improved gas analyzing apparatus adapted for measuring the combustible components of the exhaust gases from an internal combustion engine.

Instruments have long been known designed to measure the combustible components of furnace flue gases and the like, by passing a stream of the gas through a combustion chamber and measuring the resulting increase in temperature. Many difficulties have been encountered in attempts to apply this general method of analysis to the accurate determination of combustible in exhaust gases from internal combustion engines, because of the normally low and rapidly varying proportion of combustible components in such exhaust gases, and because of the rapid variations in pressure and temperature of the exhaust gases with changes in engine speed.

The primary object of the present invention is to provide an improved gas analyzing apparatus capable of giving accurate, continuous and rapid determinations of the exhaust gases from internal combustion engines.

A feature of the improved gas analyzing apparatus of the present invention which contributes markedly to its continuity and reliability in operation, lies in the employment in the analyzing element of duplicate combustion and comparison chambers through which proportioned streams of gas to be tested for combustible, and of a comparison non-combustible gas, are respectively passed at uniform controlled rates, both such streams being preheated uniformly to a temperature above the ignition temperature of any combustible in the gas stream under test. By employing thermocouples developing a high E. M. F., for measuring the temperature differential after combustion of separate uniflow streams of gas under test and comparison gas, uniformly preheated to the ignition temperature of the gas under test, the apparatus has been found to have greater sensitivity and reliability in continuous operation than any other gas analyzing equipment known to the applicant.

A further object of the invention is to provide an apparatus of the type described which is so simple in design that it may be readily assembled in a compact unit adapted for easy manual transportation, and may be operated by the average mechanic or automobile operator without the aid of a skilled chemist.

With the above and other objects and features in view, the invention will be hereinafter more specifically described in connection with the accompanying drawing, which illustrates diagrammatically a practical embodiment of the apparatus in its preferred form.

In the diagrammatic layout of the apparatus which is illustrated, 10 designates a supply line through which flue gas or other gas mixture to be tested for combustible, enters the apparatus. The gas passes first through a filter 12 filled with mineral wool 14 or other suitable filtering medium for removing solid and liquid particles from the gas to be tested. From filter 12 the gas passes through a conduit 16 into a scrubber 18 wherein the gas sample is further purified by liquid scrubbing, as for example with a mixture of transformer oil and kerosene.

A pressure relief connection 20 is ported out of line 16 between filter 14 and scrubber 18, and on the discharge end of this connection there is mounted a flap valve 22 of hard rubber or other suitable material adapted to form a tight fit with its seat against entrance of air and to open whenever the pressure in line 16 increases substantially above atmospheric pressure.

From oil scrubber 18 the gas flows through pipe 24 and conduit 26 to a sampling orifice 28 which serves to regulate and measure the volume of the gas taken for sampling purposes. Air for burning any combustible in the gas sample enters the apparatus at 30 from atmosphere and is admixed with the gas in measured amount as it flows between sample orifice 28 and another mixture orifice 32 which functions as a proportioning valve for regulating admixture of air with the gas and measures the volume of gas-air mixture passed to the testing unit. From orifice 32 the gas-air mixture enters main analyzing element 34 of the apparatus through pipe 36.

A motor driven constant speed exhauster pump 38 is connected to discharge port 40 of analyzer 34 by means of tubing 42. Pump 38 discharges into exhaust pipe 44.

A constant level pressure regulator or liquid well 46 is connected by conduit 48 with gas sample inlet tube 24 and likewise by conduit 49 with discharge pipe 42. The head of liquid maintained in pressure regulator 46 fixes the rate of flow of the gas sample through the analyzing element 34. Moreover, since by reason of the design of relief flap valve 22 substantially atmospheric pressure obtains in sample pipe 16, as well as in air inlet conduit 30, the head of liquid in pressure regulator 46 also measures the rate of flow of air from pipe 30 through conduit 50, (having a balancing air orifice 52 therein) and the comparison gas side of analyzing unit 34.

The size of balancing orifice 52 in comparison gas supply conduit 50 is the same as, or constantly proportioned to, that of sample orifices 28 and 32 in gas supply conduits 26, 36. A regulating valve 54 is provided in connection 42 at the inlet of pump 38, and a valve 56 is also provided in a by-pass connection between inlet pipe 26 and discharge pipe 42. The extent of the negative pressure produced by the pump 38 in the gas analyzing element may be adjusted by valve 54 and by the depth of liquid in manometer 46.

A pair of heating coils 58 and 60 is mounted side by side in analyzing unit 34, coil 58 being mounted with its longitudinal axis in line with the axis of pipe 36, and coil 60 being mounted with its longitudinal axis in line with air pipe 50. Thin walled heat resistant refractory cylinders 62 and 64 of some material such as agalmatolite are mounted concentrically around each of the coils 58 and 60. Heating coils 58 and 60 are connected with each other and through leads 66 and 68 with ammeter 70, with secondary coil 72 of a transformer 74, and with the terminals of a filament control rheostat 76. The primary coil 78 of the transformer 74 is supplied with current from the circuit 80 which actuates a constant speed motor 82, driving pump 38. The 110-volt current normally supplied to the transformer 74 through circuit 80 is converted by the transformer, preferably to a two-volt current, for use in heating coils 58 and 60.

Both coils 58 and 60 have the same capacity and therefore serve respectively to heat the gas-air stream supplied through conduit 36, and the comparison air stream supplied through conduit 50, uniformly to a temperature above the ignition temperature of any combustible in the sample of gas under test. Since the coils 58 and 60 are preferably constructed of platinum ribbon or other suitable catalyst for oxidizing reactions, satisfactory operation of the analyzer is usually obtained by supplying current to the coils 58 and 60 in amounts sufficient to raise the temperature of the gas-air mixture and the comparison air stream to approximately 800 to 900° F. The intensity of the heating current is of course controlled by the rheostat 76, and indicated by the ammeter 70.

Any temperature differential set up between the gas-air stream passing through coil 58 and the comparison air stream passing through coil 60 is the result of combustion of combustible components of the gas taking place within coil 58. A plurality of thermocouples is shown connected in series with their hot junctions 84 mounted at the upper or discharge end of coil 58 and their cold junctions 86 mounted at the upper or discharge end of coil 60. The thermocouples are mounted in circuit with a galvanometer or millivoltmeter 88 adapted to measure the current set up by the opposed hot and cold junctions of the thermocouples as the result of the increase in temperature of the gases discharged from coil 58 because of combustion of combustible components of the gas-air mixture, taking place in contact with coil 58. Very good results are obtained with thermocouple junctions comprising a platinum rhodium alloy on one side and a nickel-copper alloy on the other. Chromium and platinum couples are also satisfactory. Heavy gauge thermocouples are preferred because they permit the use of appreciably lower reaction temperatures.

Before taking readings, a zero setting of the galvanometer is made by drawing air or non-reactive gas streams through both coils of the analyzer and bringing the temperature of such streams to approximately 800° F. During operation of the instrument a check on the zero setting of the galvanometer may be made by simply reducing the current supply to the heating coils below the point of minimum temperature required for effecting catalytic combustion of combustible components of the exhaust gas-air mixture.

In operation the intake extension of the sampling tube 10 is inserted in the exhaust pipe of an internal combustion engine, the pump 38 is started, and the valves are adjusted so that part of the gas sample taken bubbles through the liquid in the pressure regulator 46. Any pulsating pressure occurring in the exhaust pipe of the engine is ironed out to a constant substantially atmospheric pressure by operation of the flap valve 22. Particles of dust, carbon, water vapor, oil and the like are removed from the gas in the filter 12 and scrubber 18. In the tester 34 the gas sample-air mixture arriving through tube 36 is preheated to its ignition temperature and then ignited by contact with the catalyst heating coil 58. Simultaneously a comparison stream of air of constantly proportioned volume is preheated to the same temperature as the sample gas-air mixture under test, by contact with the coil 60. The resulting combustion increases the temperature of the gas passing through coil 58 and likewise the temperature of the hot junctions 84 of the thermocouple, thereby unbalancing the opposed E. M. F. developed by the hot and cold thermocouple junctions and causing a current to flow through the terminals of the millivoltmeter or galvanometer 88. Having set the galvanometer scale so as to register 100 when no combustible constituents are present in the gases passing through coil 58, the galvanometer can be calibrated to read directly in terms of percentage completeness of combustion within the cylinders of the internal combustion engine under test. After passing through the ignition coil 58 the gas sample under test enters the upper portion of chamber 34 where it becomes admixed with the comparison air stream previously passed through coil 60. From chamber 34 the mixture of products of combustion and comparison air is drawn through pipe 42 and pump 38 and forced into discharge pipe 44.

Flow of substantially constantly proportioned streams of gas-sample-air mixture and of comparison air respectively through the two heating coils 58 and 60 of the analyzer, is secured by adjusting the orifice valves 28, 32 and 52. A constant regulated rate of flow of gases through the apparatus is secured by adjusting the suction pressure of the pump by means of valve 54 so that gas will bubble slowly through say 4" of water in pressure regulator 46, thereby maintaining a constant pressure drop of 4" between the intake and the outlet sides of the testing unit. It is very important that the testing be done with substantially constantly proportioned volumes of gas-sample-air mixture and comparison air streams flowing at an optimum constant rate and both maintained at a uniform temperature above the ignition temperature of any combustible in the exhaust gas sample.

From the above disclosure it will be seen that the present invention provides a gas analyzing apparatus of simple design, capable of giving continuous, quick, and reliable determinations of the quality of combustion occurring in an internal combustion engine in a manner which will enable a relatively unskilled operator to determine what adjustment is to be made to engine carbureter and spark timing, while observing the effect of such adjustments directly in terms of completeness of combustion.

One specific embodiment of the invention having been thus described, what is claimed as new is:

1. In gas analyzing apparatus, a gas sample supply means including in connected relation a filter, a pressure relief valve adapted to maintain constant substantially atmospheric pressure on its pressure side, a constant flow orifice, and a proportioning valve for regulating admixture of air with the gas, a combustion cell and a comparison cell each having balanced catalyst metal heating elements mounted therein, temperature measuring mechanism operatively connected with the combustion cell and also with the comparison cell, and sensitive to any temperature differential between said cells, a mechanism for causing constantly proportioned streams of gas-air mixture and of air to flow at uniform rates respectively through the combustion and comparison cells.

2. A gas analyzing device for use in regulating combustion in an internal combustion engine comprising a suction chamber, two tubes arranged to discharge into said chamber, one of said tubes comprising a combustion cell and the other tube a comparison cell, a pair of balanced catalyst metal heating coils connected in series and each mounted within one of said cells, means for supplying electric current to said coils, means for continuously conducting into contact with the coil in the combustion cell a sample of gas to be analyzed, said means comprising in connected series a filter, a pressure relief valve adapted to maintain constant substantially atmospheric pressure on its pressure side, a liquid scrubber, a constant flow orifice, and a proportioning valve for regulating admixture of air with the gas, air supply means for conducting air from atmosphere into contact with the coil in the comparison cell, a thermocouple connected in series with a measuring instrument and having its hot junction mounted in the discharge end of the combustion cell and its cold junction mounted in the discharge end of the comparison cell, said thermocouple and instrument being adapted to measure any temperature differential set up within the two cells by combustion of combustible components of said gas sample, and mechanism for maintaining a constant degree of vacuum in said chamber and for causing constantly proportioned streams of gas-air mixture and of air to flow at uniform rates respectively through the combustion and comparison cells.

3. A process of analyzing the combustible content in hot gas which is supplied under pressure, which consists in cooling the gas and reducing it to approximately atmospheric pressure, withdrawing a portion of said gas by suction, mixing a quantity of diluting air with said gas, heating a wire of catalyzing material in a confined space electrically, conducting a portion of said mixture through said space and discharging the remainder thereof to the atmosphere, and measuring the temperatures developed in said space as the result of combustion therein to give a determination of the combustible content in said gas.

4. A process of analyzing the combustible content in a gas, which consists in continuously pumping measured quantities of the gas to be analyzed and air separately into a mixing chamber to give a mixture of constant quantity having a definite proportion of gas and air, heating a wire of catalyzing material in a confined space electrically, conducting a portion of said mixture to and through said space, discharging a portion of said mixture to the atmosphere at a point intermediate the mixing chamber and said space, and measuring the temperature developed in said space as the result of combustion therein to give a determination of the combustible content in the gas.

5. In an apparatus for analyzing gas, an electric circuit embracing a pair of balanced fixed resistance elements one of which is a catalytic agent, a chamber surrounding each of said resistance elements, the chamber surrounding the element which is a catalytic agent having an outlet to the atmosphere and an inlet, a conduit to which gas to be analyzed is supplied under pressure, said conduit having a pressure relief outlet leading to the atmosphere, means including an extension of said conduit for conducting gas from said conduit to the inlet of the chamber in which the catalytic resistance element is located, an air inlet in said conduit extension for admitting air to be mixed with the gas to be analyzed, a discharge outlet from said conduit extension for releasing excess air-gas mixture from the conduit at a point between the air inlet and the inlet to said chamber, and temperature measuring mechanism for ascertaining the temperature differential developed between the chambers as a result of gas combustion in the chamber surrounding the catalytic resistance element.

JOHN D. MORGAN.